United States Patent [19]

Nakagawa et al.

[11] Patent Number: 4,939,636
[45] Date of Patent: Jul. 3, 1990

[54] MEMORY MANAGEMENT UNIT

[75] Inventors: Norio Nakagawa, Kodaira; Katsuaki Takagi, Higashimurayama; Tuneo Funabashi, Tokyo, all of Japan

[73] Assignee: Hitachi, Ltd., Tokyo, Japan

[21] Appl. No.: 15,097

[22] Filed: Feb. 17, 1987

[30] Foreign Application Priority Data

Mar. 7, 1986 [JP] Japan ................... 61-48316

[51] Int. Cl.$^5$ .............................. G06F 1/00
[52] U.S. Cl. ................... 364/200; 364/228.1; 364/228.7; 364/228.9; 364/238.4; 364/243; 364/255.1; 364/256.3
[58] Field of Search ... 364/200 MS File, 900 MS File

[56] References Cited

U.S. PATENT DOCUMENTS

| | | | |
|---|---|---|---|
| 4,400,770 | 8/1983 | Chan et al. | 364/200 |
| 4,471,429 | 9/1984 | Porter et al. | 364/200 |
| 4,477,871 | 10/1984 | Keshlear | 364/200 |
| 4,486,834 | 12/1984 | Kobayashi et al. | 364/200 |
| 4,495,567 | 1/1985 | Treen | 364/200 |
| 4,539,636 | 9/1985 | Sääksjärvi | 364/200 |
| 4,654,829 | 3/1987 | Jiang et al. | 365/189.03 |
| 4,669,043 | 5/1987 | Kaplinsky | 364/200 |
| 4,675,811 | 6/1987 | Kishi et al. | 364/200 |
| 4,718,006 | 1/1988 | Nishida | 364/200 |
| 4,777,595 | 10/1988 | Strecker et al. | 364/200 |
| 4,794,524 | 12/1988 | Carberry et al. | 364/200 |

Primary Examiner—Gareth D. Shaw
Assistant Examiner—Rebecca L. Rudolph
Attorney, Agent, or Firm—Antonelli, Terry, Stout & Kraus

[57] ABSTRACT

In a multiprocessor system having a hierachal memory device employing a virtual memory system, serial communication means which makes it possible for memory management units, which are disposed for CPUs, respectively, to communicate with one another, so that any change of common memory management information can be exchanged directly between the memory management units. As a result, it is not necessary for each CPU to inform the memory management unit of any change of the memory management information by an operating system, so that the overhead of communication between CPUs can be reduced and memory management can be made correctly without applying any load to the operating system even when any change occurs in the memory management information.

20 Claims, 7 Drawing Sheets

MEMORY MANAGEMENT UNIT

BACKGROUND OF THE INVENTION

This invention relates to data processing technique and to a technique which is effective particularly when applied to memory management in a system having a hierachal memory device. For example, the present invention relates to a technique which is effective when utilized in a memory management unit in a multiprocessor system having at least two central processor units (CPUs) or microprocessors.

Figure 9:
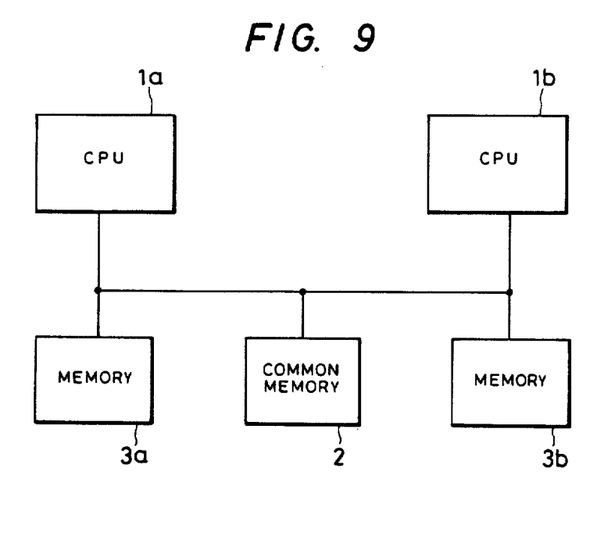
FIG. 9 is a system structural view of a conventional multiprocessor system.

In data processing systems, so-called "multiprocessor systems" which include at least two CPUs are well known. In such a multiprocessor system, communication between CPUs becomes necessary. However, the conventional CPU is not equipped with means for direct communication with another CPU. Therefore, as shown in FIG. 9 of the accompanying drawings, there has been proposed a parallel communication system in which communication between two CPUs 1a and 1b is carried out through a common or shared memory 2 which is connected in common to these CPUs 1a and 1b.

In the multiprocessor system, local memories 3a and 3b are also provided in close connection with the CPUs under their control.

SUMMARY OF THE INVENTION

Figure 10:
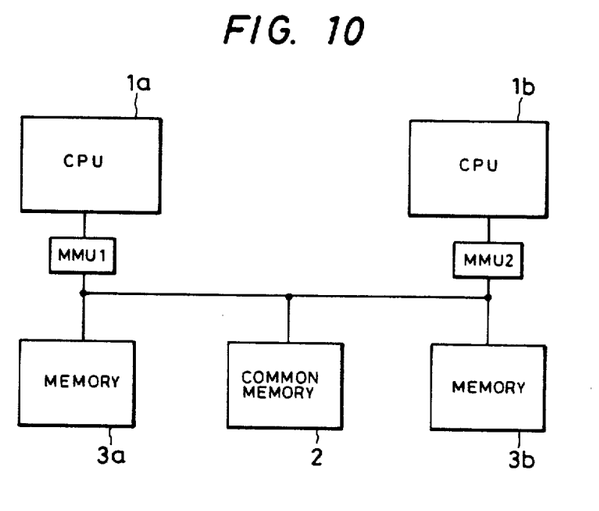
FIG. 10 is a system structural view of the multiprocessor system investigated by the inventors of the present invention prior to the completion of the present invention.

The inventors of the present invention attempted to construct a multiprocessor system having a hierachal memory structure employing a virtual memory system; consisting of main memories 2, 3a, 3b to which access can be made at a high speed and a secondary memory having a large capacity (not shown), and examined a multiprocessor system equipped with memory management units MMU1, MMU2 shown in FIG. 10 in order to manage this hierachal memory device.

In the multiprocessor system described above, if desired data does not exist in the main memory when CPU 1a or 1b makes access to the common memory 2, data substitution is made between it and the secondary memory in a page unit, for example, and at the same time, a conversion table and management information are rewritten. In this manner, the control information concerning the common memory 2 is stored in each MMU1, MMU2 and when any change occurs in the memory control information, such a change must be exchanged between the memory management units MMU1 and MMU2 or else correct data cannot be obtained when a CPU refers to the common memory 2.

In accordance with the heretofore known memory management unit, however, since the unit is not equipped with a direct communication means, the change of the memory control information is made between CPUs through the common memory 2 and then is indicated to each memory management unit MMU1, MMU2.

However, in the system described above, the overhead of communication between CPUs becomes great and a long period of time is necessary before the correct memory control information is inputted into each memory management unit. Therefore, there is the possibility that wrong data is read out in the mean time and the system operation becomes erroneous. These problems are clarified by the inventors of the present invention.

In a multiprocessor system having a hierachal memory device employing a virtual memory system, it is a primary object of the present invention to provide correct memory management without applying any load to an operating system even when a change occurs in memory management information.

The above and other objects and novel features of the present invention will become more apparent from the following description when taken in conjunction with the accompanying drawings.

Among the inventions disclosed herein, the following will illustrate a typical example.

In a microprocessor system having a hierachal memory device employing a virtual memory system, the present invention provides a respective memory management unit for each CPU, with serial communication means extending between memory management units for accomplishing mutual communication so that any change of common memory management information can be exchanged directly between the memory management units.

According to the means described above, it is not necessary for CPUs to exchange information concerning changes in the memory management information between them using the operating system of the CPU, and so it becomes possible to reduce the system overhead. Even if a change occurs in the memory management information, memory management can be carried out without applying any load to the operating system of any CPU.

DESCRIPTION OF THE PREFERRED EMBODIMENTS

Figure 1:
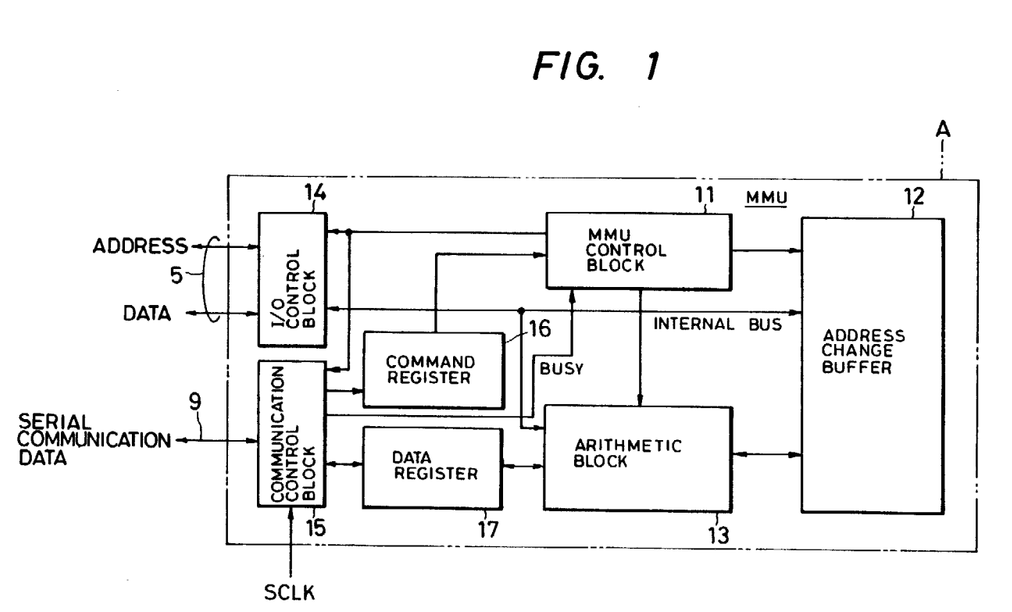
FIG. 1 is a block diagram showing the present invention applied to a memory management unit for managing a virtual memory system.

FIG. 1 is a block diagram showing the memory management unit for virtual memory management in accordance with one embodiment of the present invention.

Though not particularly limitative, each circuit block encompassed by one-dot chain line A in the drawing is formed on one semiconductor chip such as a single crystal silicon substrate. Each circuit block may be incorporated on one semiconductor chip on which a CPU is formed.

The memory management unit MMU in this embodiment consists of an MMU control block 11 for controlling the unit as a whole, an address change buffer 12 storing a table for changing the address that is used for virtual memory management and various other management information, an arithmetic block 13 which in turn consists of an ALU (arithmetic and logical unit) and various registers and shifters, an I/O (input/output) control block 14 for the interface of input/output signals such as the address signals and the data signals, and a communication block 15 for serial communication with other memory management units. The address change table necessary for virtual memory management is stored as a whole in an external main memory and a part thereof is stored in the address change buffer 12.

The MMU control block 11 described above, which is constructed as a PLA (programmable logic array) or microprogram ROM, though not particularly limitative, retrieves the address change table to obtain the physical address of the actual memory by use of the logical address supplied from the CPU through the I/O control block 14, examines the correction bits and rewrites it to the corresponding memory page in the secondary memory device as to the memory page for which re-write is designated, when the unnecessary page data is discharged from the main memory.

The MMU control block 11 decodes a command sent thereto from another memory management unit through the communication control block 15 in order to re-write the page information and management information inside its address change buffer 12, or instructs the transmission of the information which is changed to the communication control block 15 when the information relating to the common memory inside the address change buffer 12 is changed.

In other words, the communication control block 15 in this embodiment controls only the communication protocol, and decoding and execution of the actual command and data are effected by the MMU control block 11.

In order to deliver the command received by the communication control block 15 to the MMU control block 11 or to exchange the transmission and reception data between the communication control block 15 and the arithmetic block 13, a command register 16 and a register 17 form an interface between the blocks inside the memory management unit.

Figure 2:
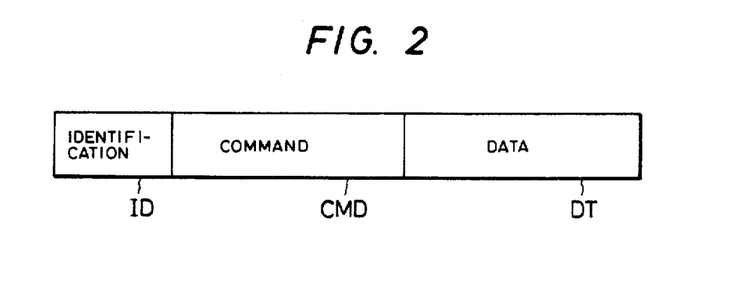
FIG. 2 is an explanatory view showing an example of the format of communication data used for communication between the memory management units in accordance with the present invention.

FIG. 2 shows an example of the format of the communication data suitable for the communication between the memory management units described above.

In other words, the communication data in this embodiment consists of an identification portion ID, a command portion CMD and a data portion DT. The identification portion ID is the portion which designates the memory management unit MMU which is to receive the communication, and designates by its uppermost bit whether the communication is a global communication directed to all the memory management units or a local communication directed to an individual memory management unit.

A plurality of remaining bits of the identification portion ID are coded bits for designating the memory management unit which is to receive the communication, for example. Therefore, to which memory management unit the communication is directed can be determined by referring to the remaining bit portion of this identification portion ID. In other words, each memory management unit is provided with a particular recognition code and can know whether the communication is addressed to it or to another unit by judging whether or not the code in the identification portion ID is in agreement with the recognition code allotted to it. Accordingly, in the multiprocessor system consisting of a plurality of CPUs and memory management units connected to or incorporated in the CPUs, communication can be made not only to the particular memory management unit, but also to all the memory management units.

In the communication data, the command portion CMD following the identification portion ID stores the command codes representing the content of processing. The kinds of the commands (instructions) stored here include the following in view of the object of communication that the memory management information must be sent to other memory management units.

The first command is an instruction for changing the flag that is disposed for each page in order to represent the history of the memory page such as correction bits, access bits, and the like. The correction bit is used to indicate whether or not the CPU has written (corrected) the data in the corresponding page, while the access bit is used to indicate whether or not a read operation has been made for the corresponding page. The access bit can be used for executing a page re-write algorithm called "LRU (Least Recently Used)", for example.

Other instructions stored in the command portion CMD of the communication data include a change instruction for protection information and a transfer instruction between the main memory and the secondary memory in relation to the common page.

The protection information represents whether or not the microprocessor can read, write and execute a program for each page. If there is protection information inhibiting the write operation, for example, it becomes possible to inhibit the write operation for the page storing important data, such as a program for the operating system. The transfer instruction between the main memory and the secondary memory is used when the re-write operation of the common page is made.

If various information such as described above are prepared, mutual coincidence of the common memory management information can be kept inside a plurality of memory management units in relation to the common memory.

On the other hand, among the communication data, the data portion DT stores the data representing the designation of the object of processing corresponding to the command, such as the page number or the like whose change occurs on the address change table, and how it changes.

Figure 3:
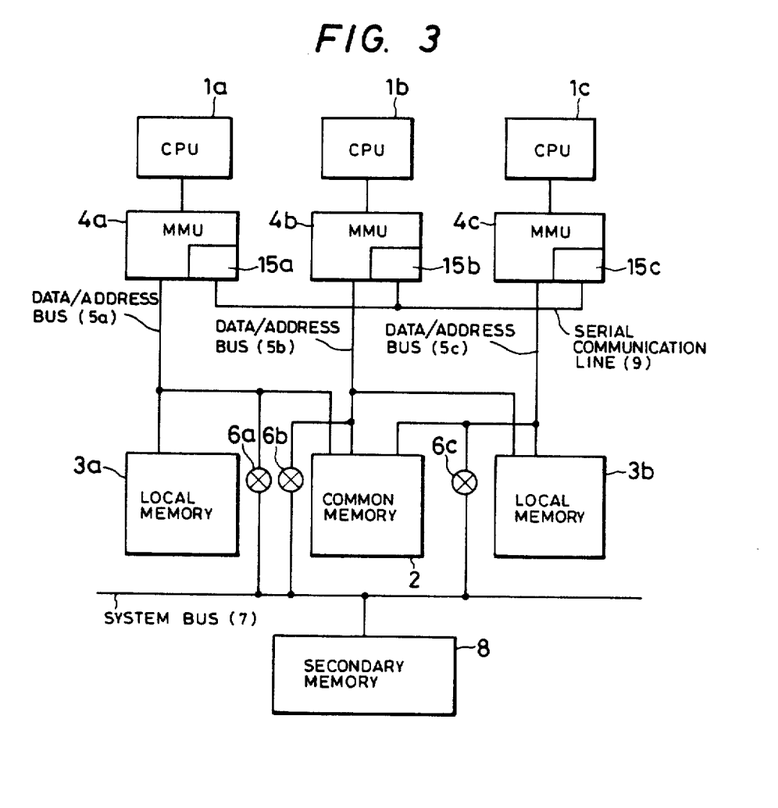
FIG. 3 is a block diagram showing an example of the construction of a multiprocessor system using the memory management units in accordance with the present invention.

FIG. 3 shows an example of the construction of a multiprocessor system using the memory management units having the construction described above.

This system consists of three CPUs 1a, 1b, 1c, the memory management units 4a, 4b, 4c that are closely connected to, or incorporated in, the respective CPUs, and memories 2, 3a, 3b. The memory 3a is a local memory to which access can be made by only CPU 1a, for example, which is under control of the memory management unit 4a. The memory 3b is a local memory which is under control of the memory management units 4b and 4c and to which access can be made by CPUs 1b and 1c. CPUs 1b and 1c together constitute a computer system having a master-slave relation.

On the other hand, the common memory 2 is a common memory which is under control of all the memory management units 4a, 4b and 4c and access to this memory 2 can be made from all CPUs.

Data/address buses 5a, 5b, 5c connecting the memory management units 4a~4c to the memories 2, 3a, 3b can be connected to a system bus 7 through bus switches 6a, 6b, 6c. Accordingly, a page can be re-written between the secondary memory 8, such as a hard disk or a floppy disk connected to the system bus 7, and the memories 2, 3a, 3b. Incidentally, a serial communication line 9 is provided for effecting serial communication between the memory management units 4a, 4b and 4c. This serial communication line 9 is used for transmitting signals between the communication control blocks (15a, 15b, 15c) disposed for the corresponding MMUs (4a, 4b, 4c).

In the multiprocessor system described above, when any change occurs in the memory management unit 4a in relation to the memory management information relating to the local memory 3a, for example, there is no need to indicate that change to the other memory management units 4b and 4c. In contrast, if any change occurs in the memory management information relating to the common memory 2 in at least one of the memory management units 4a through 4c, that change must be indicated to all the memory management units. If not, the contents of the management information for the common memory will become in the respective MMUs so that the system is likely to operate erroneously. If there is any change of the management information relating to the local memory 3b in at least one of the memory management units 4b and 4c, the change must be transmitted between the memory management units 4b and 4c (but not to and from 4a). The serial communication can be made by use of the memory management unit shown in FIG. 1.

Next, the definite construction of the communication control block 15 in the memory management unit will be described.

As the serial communication system for the memory management units of the embodiment described above, it is possible to use a serial communication interface system employed in a single-chip microcomputer such as Model HD6303 of Hitachi, Ltd., for example, or a CSMA/CD (Carrier Sense Multiple Access/Collision Detection) system of the type employed in a local network system.

Figure 4:
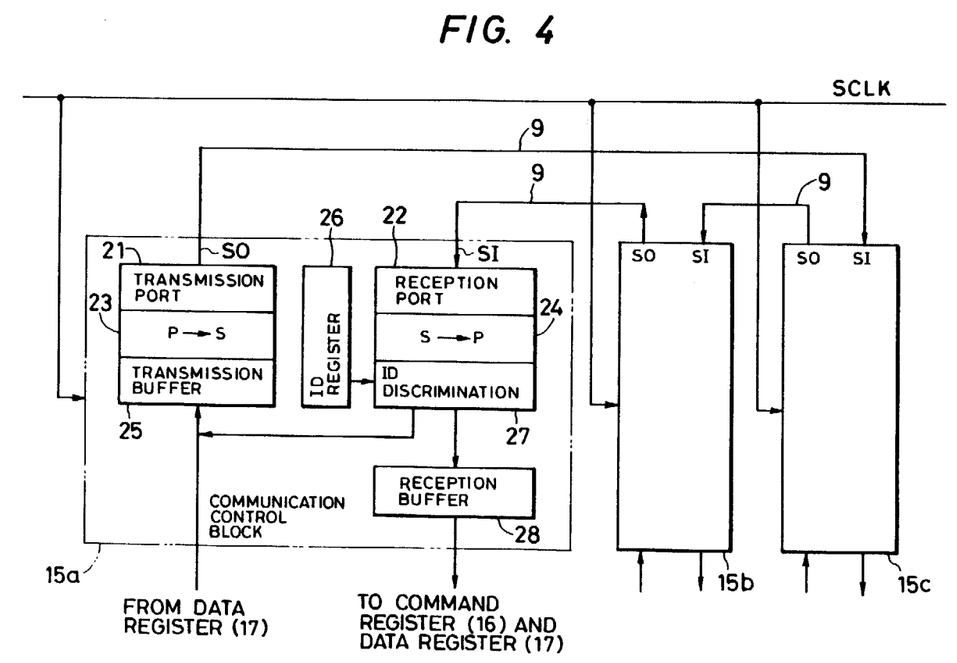
FIG. 4 is a block diagram showing an example of the construction of the principal portions of the communication control block inside the memory management unit employing a serial communication interface system and the connection between the communication control blocks.

FIG. 4 shows an example of the construction of the communication control block 15 when the serial communication interface system is employed and the system construction between the communication control blocks.

The communication control blocks 15a through 15c in the memory management units 4a, 4b and 4c have the same construction. As represented and shown in detail by the communication control block 15a, each block consists of a transmission port 21 which means substantially a serial signal reception terminal, a parallel-series conversion circuit 23 consisting of a shift register and connected to the transmission port 21, a series-parallel conversion circuit 24 consisting of a shift register and connected to the reception port 22, an ID register 26 to which the identification portion ID is set, a discrimination circuit 27 for judging coincidence and discordance of the reception data supplied from the ID register 26 through the identification portion and the series-parallel conversion circuit 24 with the recognition code, and buffers 25, 28 for temporarily holding the transmission data and the reception data.

The ID register 26 is programmable and though not particularly limitative, a fixed value in the system is written into this register under control of the CPU.

Though not particularly limitative, the reception buffer 28 in this embodiment has a large capacity to store a plurality of communication data so that no communication data are neglected when a plurality of communication data are transmitted during the processing of their data by the MMU control block 11 shown in FIG. 11. However, the transmission buffer 25 need not always have a large capacity.

In this embodiment, the system clock SCLK is supplied in common to the communication control blocks 15a, 15b and 15c so that serial communication is made in synchronism with the system clock SCLK. However, communication is not particularly limited to the clock synchronization system.

When data to be communicated occurs with the change of the memory management information, the communication data is supplied to the transmission buffer circuit 25 through the data register 17 shown in FIG. 1. The parallel-series conversion circuit 23 receives the parallel data signal from the transmission buffer circuit 25 and converts it to a series data signal. The series data signal outputted from the parallel-series conversion circuit 23 is supplied to other memory management units through the transmission port 21.

The communication data contains the identification portion ID as described already. As described already, too, the identification portion ID consists of the uppermost bit representing that communication is global communication or local communication, and the rest of the identification code bits provide a unit address. The identification codes generated from the transmission side of the communication data are in agreement with the identification codes given to the memory management unit receiving the communication in the case of the local communication, as described already. In the case of the global communication, the identification codes generated from the transmission side are those codes which are arranged in such a manner that an end of communication can be detected by referring to the communication data itself. The identification codes in this case are the same as the identification codes given to the memory management unit on the transmission side itself, though this is not particularly limitative.

The series-parallel conversion circuit 24 receives the serial signal as communication data through the reception port 22 and converts it to a parallel signal.

The discrimination circuit 27 performs the following control operations on the basis of the ID data of the identification portion among the reception data supplied from the series-parallel conversion circuit 24 and the identification data set in advance to the ID register 26.

First of all, when the uppermost bit of the identification portion ID of the received communication data represents the global communication level and the recognition code in such received communication data is in agreement with the recognition code of the ID register 26, the discrimination circuit 27 finishes communication when the communication data transmitted from the transmission side is supplied to the transmission side. At this time, the communication data set to the series-parallel conversion circuit 24 is not given to the reception buffer 28 and the transmission buffer 25.

When the uppermost bit of the identification portion ID in the received communication data represents the global communication level and the recognition code is not in agreement with the recognition code of the ID register 26, the discrimination circuit 28 lets the reception buffer 28 receive the communication data given to the series-parallel conversion circuit 24 and lets it supply the data to the transmission port 21 through the transmission buffer 25 and the parallel-series conversion circuit 23. In this manner, the received communication data is again outputted as serial data from the transmission port.

When the uppermost bit of the identification portion ID among the received communication data represents the local communication level and the recognition code is in agreement with the recognition code of the ID register 26, the discrimination circuit 27 lets the reception buffer 28 receive the received communication data set to the series-parallel conversion circuit 24. In this case, the discrimination circuit 27 does not execute the transfer of the received transmission data to the transmission buffer 25.

When the uppermost bit of the identification portion ID among the received communication data represents the local communication level and the recognition code is not in agreement with the recognition code of the ID register 26, the discrimination circuit 27 outputs the received communication data to the transmission port 21 through the transmission buffer 25 and the parallel-series conversion circuit 23. In this case, the discrimination circuit 27 does not execute the transfer of the communication data set to the series-parallel conversion circuit 24 to the reception buffer 28.

As described above, when the identification portion ID of the received communication data represents the local communication and the recognition code is not in agreement with the recognition code applied to itself, each communication control block 15 does not take the communication into the memory management unit but outputs it as such to the transmission port 21. In contrast, when the code in the identification portion ID is in agreement with its own recognition code, the communication control block 15 lets the buffer 28 receive and store the contents of the command portion CMD and data portion DT continuing the identification portion ID. Since reception has priority over transmission in the communication control block 15 and reception is always possible, the MMU control block 11 cannot always receive the data. Accordingly, the reception data is first stored in the buffer 28 and only the fact of reception is indicated to the MMU control block 11.

Accordingly, when the processing that is being executed is complete, the MMU control block 11 receives and decodes the leading command taken into the buffer 28 and can execute the corresponding processing. At this time, the information necessary for the processing is delivered to the arithmetic block 13 from the buffer 28 through the data register 17.

When the received communication data is judged to be the global communication for all the other memory management units, the communication control block (e.g. 15a) of each memory management unit lets the buffer 28 take and store the received data therein and lets it transmit the same content to the memory management unit 15c of the next stage. However, when communication is through the memory management units and the memory management unit receives the data having the same content as the data it has transmitted, it does not transmit the data to the memory management unit of the next stage.

Incidentally, when a plurality of memory management units are connected in the loop form by the communication line 9 as shown in FIG. 4, the recognition code given to the identification portion ID of the communication data at the time of global communication need not be brought into conformity with the recognition code of the transmission side as described already, but may be brought into conformity with the recognition code given to the memory management unit positioned immediately before the transmitting memory management unit. When the recognition code at the time of global communication is changed in this manner, the communication operation can be completed when the communication data is transmitted to all the memory management units connected in the loop. In other words, the communication operation can be completed before the transmitting memory management unit receives the communication data, and the overhead in the data communication can be reduced correspondingly. However, when the recognition code in the communication data is thus changed, the following must be taken into careful consideration. Namely, when the recognition code is set for each of a plurality of memory management units, the connection positions of these memory management units connected in the loop must be managed, too, and the operation of each memory management unit becomes complicated accordingly, and the system configuration or change becomes relatively difficult.

when the recognition code to be communicated at the time of the global communication is used as a so-called "self designation code" as described without regard to the mode of connection of a plurality of memory management units, so that the operation of each memory management unit can be relatively simplified and the system configuration becomes easier.

Figure 5:
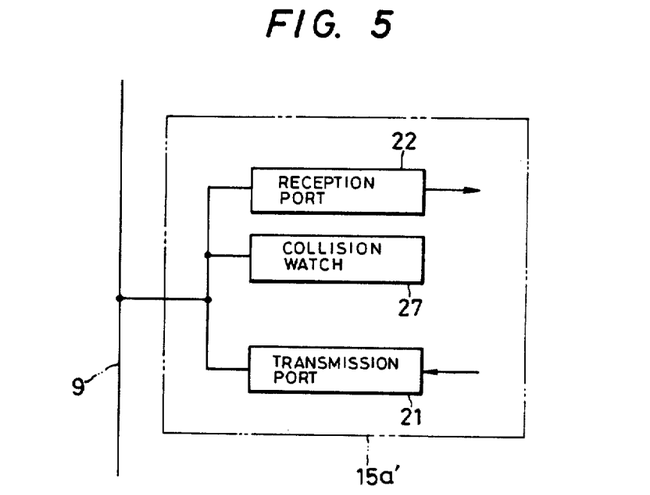
FIG. 5 is a block diagram showing an example of the construction of the principal portions of the communication control block employing a CSMA/CD system.
Figure 6:
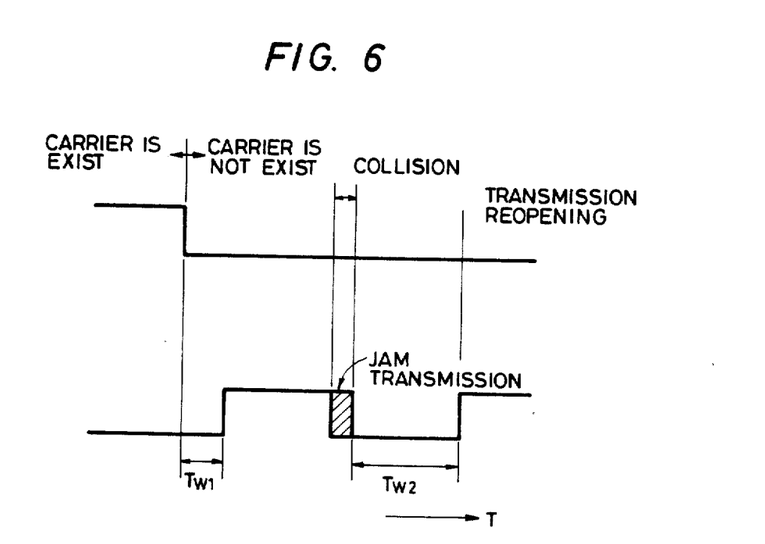
FIG. 6 is a time chart relating to the communication in the CSMA/CD system.

FIGS. 5 and 6 show the construction of the principal portions of the communication control blocks and the time chart relating thereto when the CSMA/CD system is employed as the communication system.

In this system, communication is made simultaneously for all the memory management units connected to the common communication line 9. Each communication control block (e.g. 15a') always watches if the pattern of a signal called "carrier" exists on the communication line 9. The existence of the carrier means that one of the memory management units is making a communication. Therefore, a start signal pattern is detected and the communication data following the start signal pattern is taken into the internal buffer (not shown) through the reception port 22. The format of the communication data is the same as the serial communication interface system, that is, the construction shown in FIG. 2. Each communication control block refers to the identification portion ID of the communication data and judges whether or not the data is one that is to be received by it.

In the communication control block 15a' shown in FIG. 5, the series-parallel conversion circuit, the discrimination circuit, the reception buffer and the transmission buffer on the reception side and the parallel-series conversion circuit, the ID register and the like on the transmission side, that are not shown in the drawings, are substantially the same as those shown in FIG. 4. In this case, the signal transmission path from the discrimination circuit to the transmission buffer shown in FIG. 4 is not necessary because the communication is not the serial communication.

The control operation in the discrimination circuit is somewhat different from the operation in FIG. 4.

Namely, if the bit such as the uppermost bit in the transmitted communication data represents the global communication level, the discrimination circuit, not shown, transfers the transmitted communication data to the reception buffer irrespective of the recognition code.

If the transmitted communication data indicates a local communication and the recognition code is in agreement with the recognition code given to its own ID register, the discrimination circuit transfers the transmitted communication data to the reception buffer.

If the transmitted communication data represents a local communication and the recognition code is not in agreement with its recognition code the discrimination circuit neglects the communication data. In other words, the transmitted communication data is not transferred to the reception buffer.

Transmission is possible only when no carrier exists on the transmission line 9. Therefore, after the passage of a predetermined time $T_{wl}$ from the disappearance of the carrier on the transmission line 9, the communication control block 15a' starts transmission from the transmission port 21. In this case, if a plurality of memory management units start transmission simultaneously, communication is likely to collide. Therefore, the communication control block 15a' in each memory management unit generates random numbers so that communication is started after the passage of the time $T_{wl}$ determined by the random numbers and collision of communications can be avoided. However, collision of communications cannot be avoided reliably by this method alone. Therefore, a collision watch circuit 27 is disposed in each communication control block 15a'.

The collision watch circuit 27 compares the transmitted data and the data that actually exists on the communication data and if they are different (called "jam"), it judges that collision occurs and immediately suspends transmission. Then, after the passage of a time $T_{w2}$ determined likewise by random numbers, the collision watch circuit 27 starts once again the communication provided that no carrier exists.

Next, an example of the definite control procedures in the MMU control block 11 which governs that control of the communication control block 15 and the memory management units as a whole which make it possible to effect the serial communication will be described dividedly in connection with transmission and reception with reference to FIGS. 7 and 8.

Figure 7:
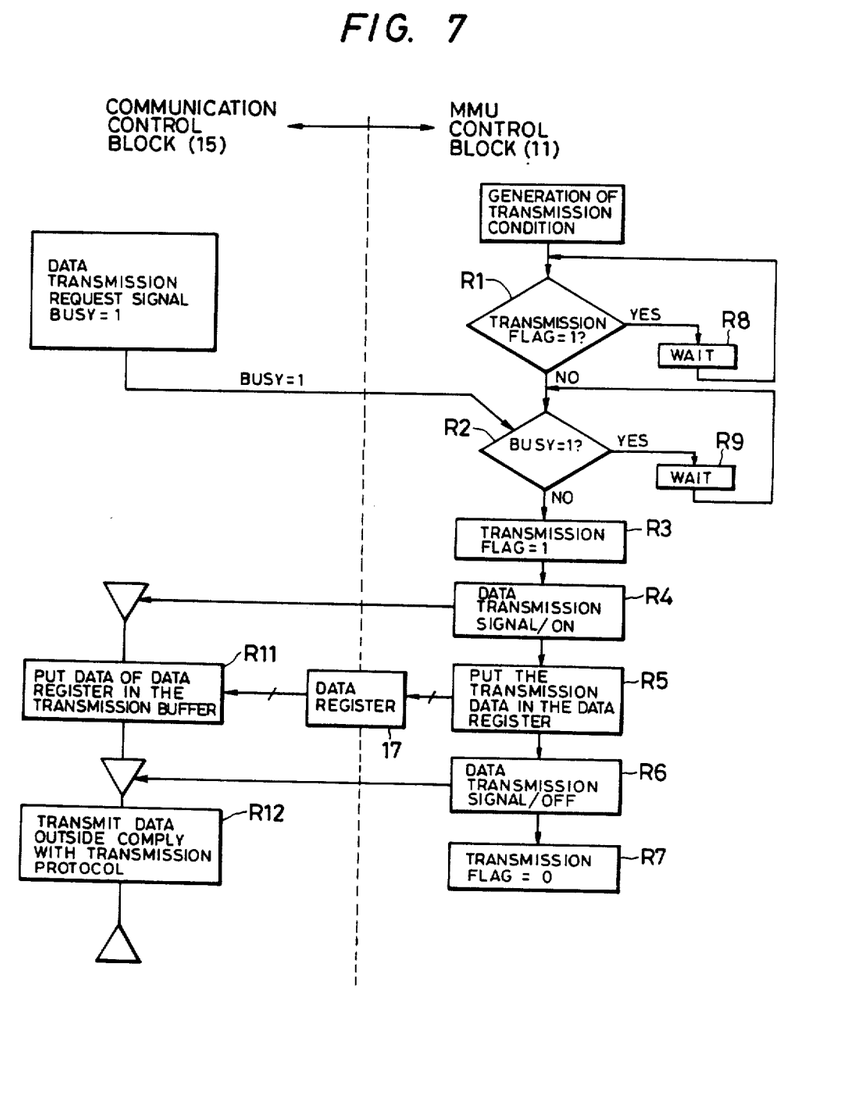
FIG. 7 is a flowchart showing an example of control procedures when transmission is made in the communication control block and the MMU control block.

FIG. 7 shows the transmission procedures.

In this drawing, the left-hand side of the dotted line shows the procedures in the communication control block 15 and the right-side side shows those in the MMU control block 11.

When a transmission condition is generated in the MMU control block 11, whether or not a transmission flag is "1" is examined at routine R1. The transmission flag is allotted to the bit of the control register in the arithmetic block 13 and when this flag is "1", it means that other data is being transmitted.

When the transmission flag is "1", the MMU control block 11 judges once again the condition of the transmission flag of routine R1 after the passage of a suitable waiting time (routine R8).

When the transmission flag is no longer "1", the flow proceeds to routine R2, and whether or not a busy signal Busy of the "1" level is generated from the communication control block 15 is examined. When receiving communication data addressed to itself, the communication control block 15 sends the busy signal Busy of the "1" level to the MMU control block 11 and generates the transmission request. When the busy signal Busy is "1", a suitable waiting time (routine R9) is allowed to pass before proceeding to the next reception procedures in order to wait for the disappearance of the busy signal Busy. When the busy signal Busy becomes "0", the flow proceeds to routine R3. Namely, after the transmission flag is set to "1", the data transmission signal supplied to the communication control block 15 is turned ON (routine R4). After the transmission data is sequentially inputted to the data register 17 (routine R5), the data transmission signal is turned OFF (routine R6), and then the transmission flag is reset to "0" to complete the transmission procedures.

On the other hand, when the data transmission signal is sent from the MMU control block 11 (routine R4), an interrupt is generated in the communication control block 15 and all the contents put into the data register 17 are taken into the buffer 25 (routine R11). Then, after the data transmission signal is turned OFF (routine R6), the data is transmitted to the communication line 9 from the transmission port 21 in accordance with the communication protocol, thereby completing transmission (routine R12).

Figure 8:
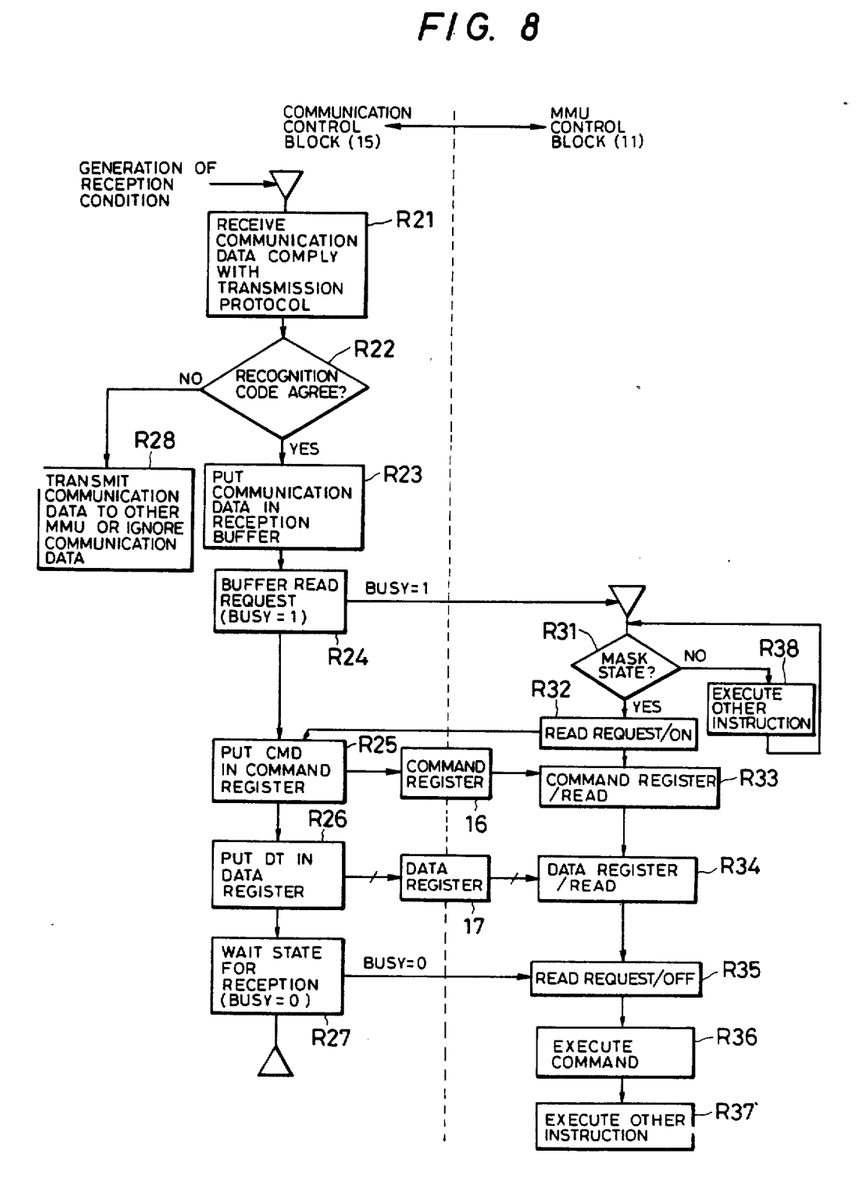
FIG. 8 is a flowchart showing an example of the control procedures when reception is made in the communication block and the MMU control block.

FIG. 8 shows an example of the reception procedures.

In the same way as in FIG. 7, the left-hand side of the dotted line represents the procedures in the communication control block 15 and the right-hand side of the dotted line shows the procedures in the MMU control block 11.

When sensing that the reception condition is generated, that is, the communication data exists on the communication line, the communication control block 15 receives the communication data in accordance with the communication protocol (routine R21) and judges whether the leading identification portion ID is in agreement with its recognition code (routine R22). If the identification portion ID is not in agreement with the recognition code, the procedure of routine R28 is executed. This procedure varies in accordance with the system of the communication control block 15.

If the construction of the communication control block 15 is of the serial communication interface type, the communication control block 15 transmits the communication data received at routine R28 to other memory management units. If the construction is of the CSMA/CD type, on the other hand, the communication control block 15 neglects the communication data at routine R28.

When the identification portion ID is in agreement with the recognition code, the flow proceeds to routine R23, and the command CMD and the data DT among the received communication data are stored in the buffer 28. Then, the communication control block sends the busy signal Busy "1" to the MMU control block 11 and requests it to read the content of the buffer 28 (routine R24).

Receiving this busy signal Busy, the MMU control block 11 judges whether or not the reception of the reception data is inhibited (mask state) in relation to the internal preference (routine R31). If the mask state is judged here, other instructions (routine R38) are executed and then judgement of routine R31 is made once again. Whether or not the received communication data is masked can be judged by judging whether or not the afore-mentioned transmission flag is "1", for example.

If a judgement is made at routine R31 that a mask is not applied, the read request signal Read is turned on in the MMU control block 11 after receiving the busy signal Busy from the communication control block 15 and is supplied to the communication control block 15 (routine R32). Upon receiving this signal, the communication control block puts the command portion CMD among the communication data which has already been taken into and held in the buffer 28 into the command register 16 (routine R25) and then puts the data portion DT into the data register 17 (routine R26). Next, the busy signal Busy is set to "0" and the communication control block then enters the waiting state of the next communication data (routine R27).

On the other hand, the MMU control block 11 reads and decodes the command when it is stored by the communication control block 15 into the command register 16 (routine R33) and reads the data stored in the data register 17. In other words, it transfers the content of the data register 17 to the arithmetic block 13 (routine R34). Since the capacity of the data register 17 is about one or two bytes, all the data DT is put into the arithmetic block 13 by repeating the transfer of the data from the buffer 28 to the data register 17 and the reading of a data register the necessary number of times.

Thereafter, the MMU control block 11 turns off the read request signal Read in response to the change of the busy signal Busy to "0" supplied from the communication control block 15 (routine R35). After executing the command read at routine R33 (routine R36), it shifts to other processings (original processings of MMU; routine R37).

As described above, in the memory management unit of this embodiment, the communication control block 15 and the MMU control block 11 operate independently of each other (coarse connection state). Therefore, the reception port is always in the reception state and since the buffer 28 is disposed inside the communication control block 15, any communication data that is sent while the MMU control block 11 is executing processing, such as table retrieval, can be taken into and held in the communication block 15. Moreover, control inside the communication control block 15 and the MMU control block 11 which employs the system reception has priority over transmission, so that the memory management information in each memory management unit can be made to coincide with one another.

Incidentally, the communication system of the communication control block 15 is not limited particularly to the example shown in FIG. 4 or 5 and any arbitrary serial communication system can be employed so long as it gives priority to reception over transmission.

In the embodiment described above, serial communication means are disposed in the memory management units so that any change of the memory management information can be exchanged between them. Therefore, since it is not necessary for the CPU to indicate the change of the memory management information by use of the operating system, the communication overhead of CPU can be reduced.

Since the communication between the memory management units is made by the serial communication system which puts priority on reception, the common memory management information can be made always to coincide with one another between the memory management units without increasing the number of pins of LSI and read-out of wrong data can be prevented.

In the multiprocessor system using the memory managements units of the embodiment described above, the CPU or MPU (microprocessor unit) can use the common memory (global memory) equivalently to the local memory so long as the management information in each memory management unit is in agreement so that the efficiency of utilization of the memory in the system can be improved. Moreover, since each memory management unit has the communication means, freedom of configuration of the memory devices under control of the memory management unit becomes higher and the system can be configured easily as desired by users.

Though the present invention has thus been described definitely with reference to the preferred embodiment thereof, the invention is not naturally limited thereto but can be changed or modified in various manners without departing from the spirit and scope thereof. For instance, in the embodiment described above, communication between the memory management units is made by one communication line, but it is also possible to provide a line for representing which memory management unit has the right of transmission, besides the communication line. Though the communication control blocks are formed on the same chip as the memory management units in the embodiment described above, it is of course possible to form the communication control blocks as external circuits of the memory management units or to assemble them into the memory management units incorporated in the microprocessor.

Though the description given above is mainly been directed to the memory management unit for the memory management of a virtual memory system as the background and field of utilization of the invention, the present invention is not particularly limited thereto but can be utilized for management units in general of other hierarchical memory devices, such as cache controllers or to the case where it is desired to provide a control LSI with communication means such as those which operate cooperatively with a microprocessor such as a co-processor but can operate independently and include therein a great deal of information.

The effect brought forth by the typical invention disclosed herein is as follows.

Namely, in the multiprocessor system having the hierachal memory device employing the virtual memory system, the memory management can be made correctly without applying any load to the operating system even when any change occurs in the memory management information.

What is claimed is:

1. A multiprocessor system having a first CPU and a second CPU, comprising:
   a first memory management unit coupled to said first CPU and including first buffer means having an address translation table storing memory control information to be used for converting a first logical address supplied from said first CPU to a first physical address based son said stored memory control information;
   a second memory management unit coupled to said second CPU and including second buffer means having an address translation table storing memory control information to be used for converting a second logical address supplied from said second CPU to a second physical address based on said stored memory control information;
   a common memory coupled to said first memory management unit and said second memory management unit through data transmission means and address transmission means; and
   a communication line coupled between said first memory management unit and said second memory management unit;
   each of said first and second memory management units having communication means for transmitting in series through said communication line multi-bit information relating to a change in said memory control information and for receiving multi-bit information relating to a change in memory control information from said communication line in series, and means for modifying the contents of the address translation table therein on the basis of the received multi-bit information, respectively.

2. A multiprocessor system according to claim 1, wherein said communication means in each of said first and second memory management units includes means for transmitting and receiving communication data in the form of a message containing identification information for designating one or a plurality of memory management units, a command portion and a data portion.

3. A multiprocessor system according to claim 2, wherein each of said first and second memory management units further includes calculation means for generating said communication data, and control means for controlling said calculation means and said communication means.

4. A multiprocessor system according to claim 1, wherein communication means in each of said first and second memory management units includes means for generating a message packet including said memory control information and transmitting means for transmitting a message packet on and for receiving a message packet from said communication line.

5. A multiprocessor system according to claim 4, wherein said transmitting means includes communication control means for controlling transmission and reception of packets message in accordance with a predetermined communication protocol.

6. A multiprocessor system according to claim 5, wherein said predetermined communication protocol gives priority to reception of message packets over transmission thereof on said communication line.

7. A multiprocessor system according to claim 1, wherein at least said first CPU and said first memory management unit are formed as a single chip microprocessor.

8. A method of controlling memory management information in a multiprocessor system having a common memory; a first memory management unit including an address translation table for storing memory control information to be used for converting a first logical address to a first physical address for said common memory; a second memory management unit including an address translation table for storing memory control information to be used for converting a second logical address to a second physical address for said common memory; data transmission means coupled to said common memory, said first memory management unit and said second memory management unit; and a communication line coupled between said first memory management unit and said second memory management unit; the method comprising the steps of:
   (a) changing said memory control information stored in said address translation table of said first memory management unit in response to data supplied thereto from said common memory through said data transmission means; and
   (b) changing said memory control information stored in said address translation table of said second memory management unit in response to a command supplied from said first memory management unit through said communication line, so as to conform said memory control information stored in said translation tables of said first and second memory management units.

9. A method according to claim 8, wherein said step (b) comprises:
   (b1) generating in said first memory management unit a message including identification information which identifies said second memory management unit and said command; and
   (b2) transmitting said message from said first memory management unit to said second memory management unit via said communication line.

10. A method according to claim 9, wherein said step (b2) is controlled in accordance with a predetermined communication protocol.

11. A method according to claim 9, wherein said step (b2) is controlled in accordance with a communication protocol which given priority to receipt of messages over transmission thereof.

12. A multiprocessor system having a first CPU, a second CPU and a third CPU, comprising:
   a first memory management unit coupled to said first CPU and including means for converting a logical address supplied from said first CPU to a physical address based on stored memory control information;
   a second memory management unit coupled to said second CPU and including means for converting a logical address supplied from said second CPU to a physical address based on stored memory control information;
   a third memory management unit coupled to said third CPU and including means for converting a logical address supplied from said third CPU to a physical address based on stored memory control information;
   a common memory coupled to said first, second and third memory management units through data transmission means and address transmission means;
   a local memory coupled to at least two memory management units of said first, second and third memory management units through data transmission means and address transmission means; and a communication line coupled among said first, second and third memory management units;

each of said first, second and third memory management units including means for providing a message, which has identification information for designating at least one of said first, second and third memory management units and multi-bit information relating to a change in said memory control information used for converting a logical address to physical address on said communication line as series data, means for receiving a message from said communication line as series data, means coupled to the receiving means for identifying the designated memory management unit on the basis of the identification information int he received message, and means coupled to the receiving means for modifying contents of the converting means on basis of the multi-bit information in the received message in the designated memory management unit.

13. A multiprocessor system according to claim 12, wherein said communication line is coupled between said first and third memory management units via said second memory unit.

14. A multiprocessor system according to claim 12, wherein each of said first, second and third memory management units is coupled to said communication line in parallel.

15. A multiprocessor system having a first CPU, a second CPU and a third CPU, comprising:

a first memory management unit coupled to said first CPU and including buffer means having an address translation table for storing memory control information to be used for converting a logical address supplied from said first CPU to a physical address;

a second memory management unit coupled to said second CPU and including buffer means having an address translation table for storing memory control information to be used for converting a logical address supplied from said second CPU to a physical address;

a third memory management unit coupled to said third CPU and including buffer means having an address translation table for storing memory control information to be used for converting a logical address supplied from said third CPU to a physical address;

a common memory coupled to said first, second and third memory management units through data transmission means and address transmission means;

a local memory coupled to at least two memory management units of said first, second and third memory management units through data transmissions means and address transmission means; and a communication line coupled among said first, second and third memory management units; and each of said first, second and third memory management units including means for providing a message, which has identification information for designating at least one of said first, second and third memory management units and multi-bit information relating to a change in said memory control information used for converting a logical address to physical address on said communication line as series data, means for receiving a message from said communication line as series data, means coupled to receiving means for identifying the designated memory management unit on the basis of the identification information in the received message, and means coupled to the receiving message for modifying contents of the address translation table on the basis of the multi-bit information in the received message in the designated memory management unit.

16. A multiprocessor system according to claim 15, wherein said communication line is coupled between said first and second memory management units via said second memory management unit.

17. A multiprocessor system according to claim 15, wherein each of said first, second and third memory management units is coupled to said communication line in parallel.

18. A multiprocessor system having a first CPU, a second CPU and a third CPU, comprising:

a first memory management unit coupled to said first CPU and including means for converting a logical address supplied from said first CPU to a physical address based on stored memory control information;

a second memory management unit coupled to said second CPU and including means for converting a logical address supplied from said second CPU to a physical address based on stored memory control information;

a third memory management unit coupled to said third CPU and including means for converting a logical address supplied from said third CPU to a physical address based on stored memory control information;

a common memory coupled to said first, second and third memory management units through data transmission means and address transmission means;

a local memory coupled to said at least two memory management units of said first, second and third memory management units through data transmission means and address transmission means; and a communication line coupled among said first, second and third memory management units;

each of said first, second and third memory management units including means for providing a message, which has identification information for designating at least one of said first, second and third memory management units and multi-bit information relating to a change in said memory control information used for converting a logical address to physical address, on said communication line as series data, means for receiving a message from said communication line as series data, and means coupled to the receiving means for identifying the designated memory management unit on the basis of the identification information in the received message information.

19. A multiprocessor system according to claim 18, wherein said communication line is coupled between said first and third memory management units via said second memory management unit.

20. A multiprocessor system according to claim 18, wherein each of said first, second and third memory management units is coupled to said communication line in parallel.

* * * * *